Aug. 29, 1933.  J. W. WEST  1,924,224
STICK GRIPPING AND CENTERING APPARATUS FOR FROZEN CONFECTIONS
Filed Oct. 10, 1932  3 Sheets-Sheet 1
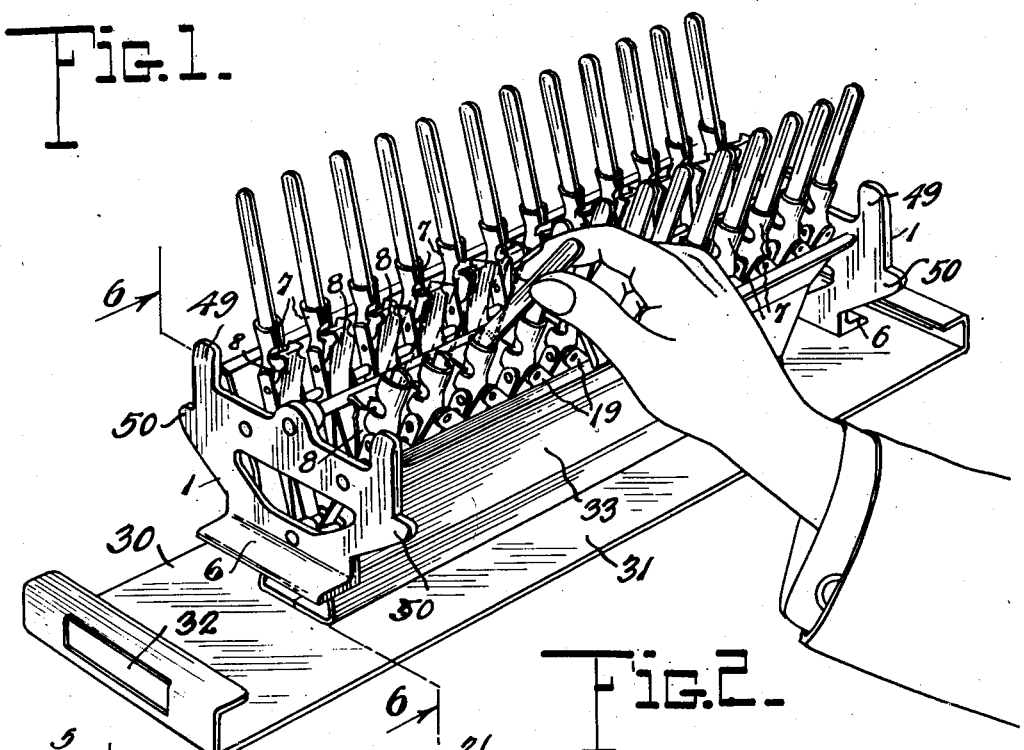
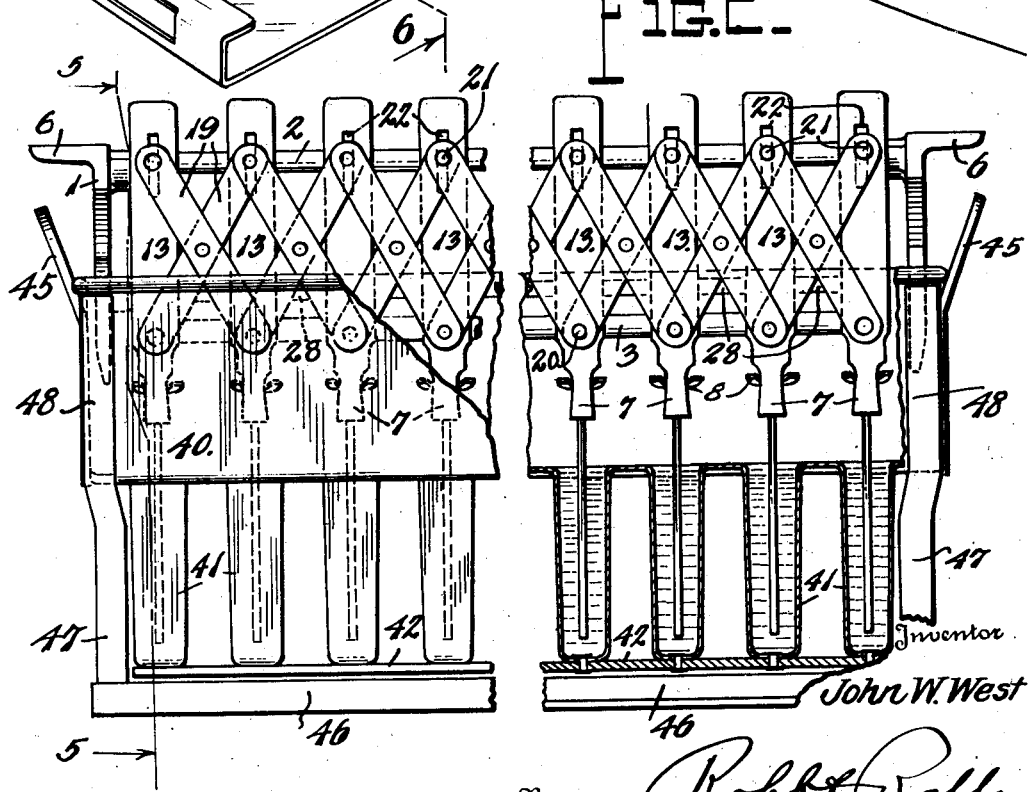

Aug. 29, 1933.   J. W. WEST   1,924,224
STICK GRIPPING AND CENTERING APPARATUS FOR FROZEN CONFECTIONS
Filed Oct. 10, 1932   3 Sheets-Sheet 2
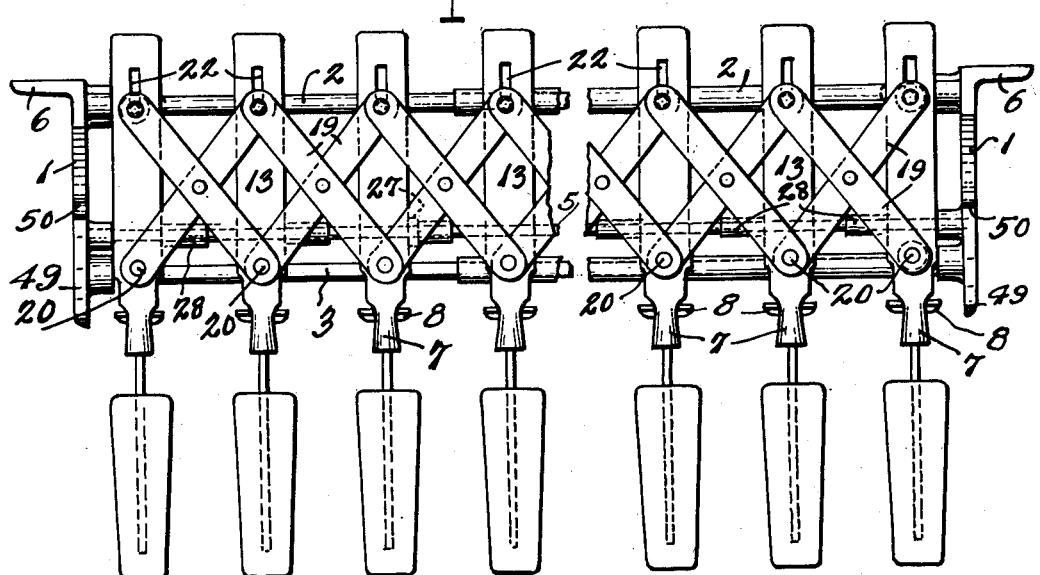
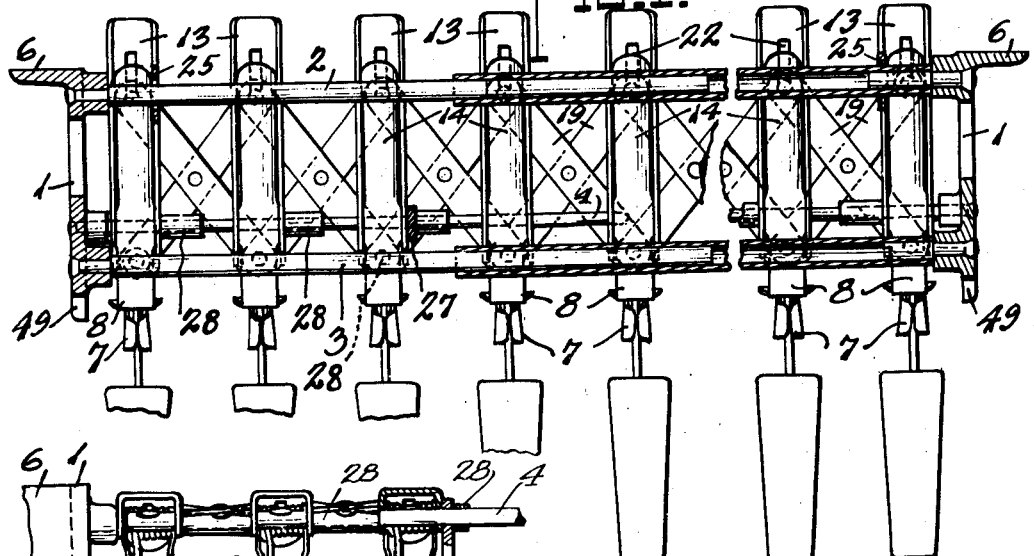
Inventor
John W. West
Robt H Robb
Attorneys Aug. 29, 1933.    J. W. WEST    1,924,224
STICK GRIPPING AND CENTERING APPARATUS FOR FROZEN CONFECTIONS
Filed Oct. 10, 1932    3 Sheets-Sheet 3
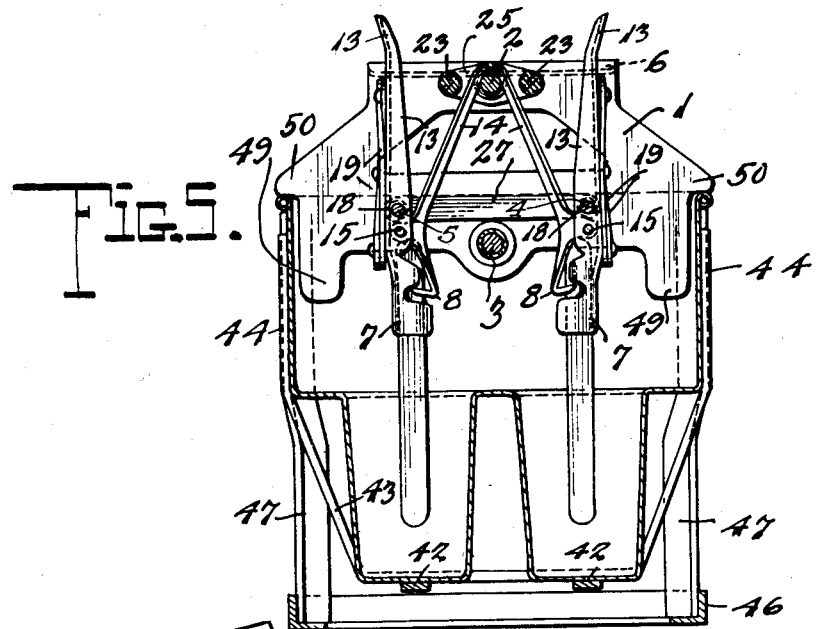
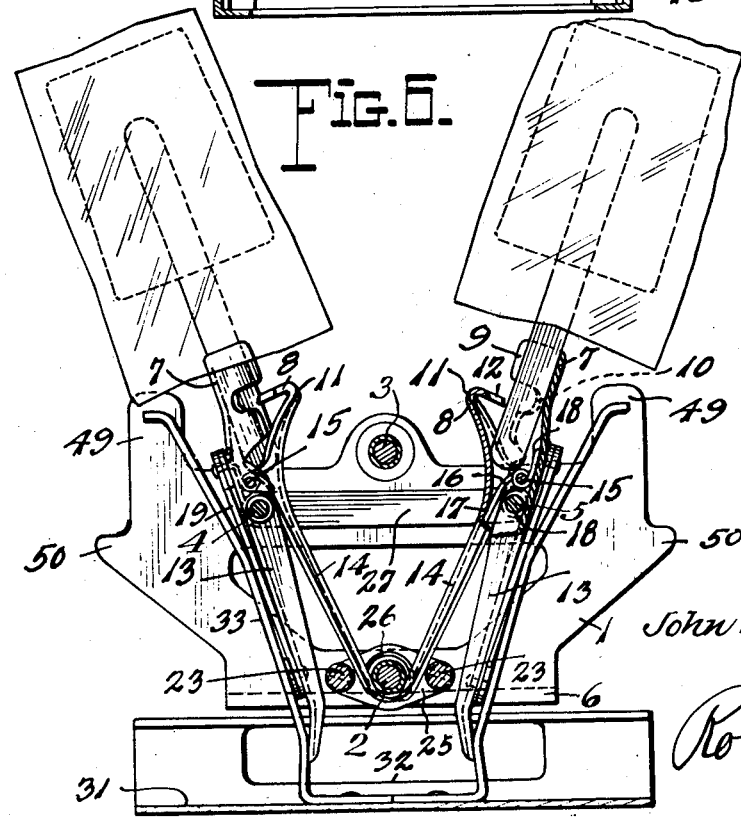

Patented Aug. 29, 1933

1,924,224

UNITED STATES PATENT OFFICE 1,924,224

STICK GRIPPING AND CENTERING APPARATUS FOR FROZEN CONFECTIONS

John W. West, New York, N. Y., assignor, by mesne assignments, to Good Humor Corporation of America Application October 10, 1932. Serial No. 637,194

14 Claims. (Cl. 107—8)

This invention relates to apparatus for forming and handling frozen confections, and more particularly to a gripper mechanism which is especially applicable for use in conjunction with mold apparatus for forming the well known frozen confections on a stick, such as Good Humors, Popsicles, and the like.

While the apparatus will be discussed principally with relation to a molding process, it is to be understood that the gripper mechanism is also applicable to the cutting or slicing process wherein a slab of ice cream or the like is cut into a plurality of individual confections into which sticks or handle elements are inserted, the ice cream being subsequently dipped into chocolate or other coating, preferably edible.

In the molding process above referred to, the confections are formed in individual molds arranged in longitudinal and transverse rows. It is desirable to suspend the stocks or handle elements into the molds during the freezing of the confection material which is liquid at normal temperatures. My gripper mechanism is an improvement over the mechanism shown in Patent No. 1,809,190 granted June 9, 1931 to R. F. Brimer. In the patent, the apparatus was particularly designed for use in conjunction with a cutting process as above referred to rather than a molding process, the confections being placed in the grippers after the cutting operation to facilitate the handling of the same during the dipping operation to coat the confections, and the subsequent wrapping or bagging thereof. The gripping mechanism embodied in the present invention not only facilitates the handling, dipping, and bagging of the confections after formation of the same, but is also particularly designed for use as a stick supporting mechanism whereby the sticks or handles may be suspended in the molds during the freezing of the confection material.

It is a further object of the present invention to provide a telescopic frame arranged for cooperation with suitable multiple mold apparatus for forming stick confections, the frame being provided with a plurality of rows of gripper elements, according to the number of rows in the mold apparatus, there being one gripper element for each individual mold.

A still further object of the invention is to provide suitable means for automatically centering the gripper elements with respect to the individual molds of the mold apparatus.

The invention further contemplates the provision of a suitable stick centering and confection handling mechanism wherein the same may be extended to separate the confections after the formation of the same about the sticks and the removal thereof from the mold apparatus, whereby the dipping and bagging operations are further facilitated.

Other and further objects and advantages of the invention will be hereinafter set forth, and the novel features thereof defined by the appended claims.

In the drawings:

Fig. 1 is a perspective view of my improved form of gripping and handling mechanism, the same being shown disposed in a suitable holder or release apparatus to condition the gripper elements for the placing of sticks or handles therein preliminary to molding the confections about the sticks or handles;

Fig. 2 is a fragmentary side elevation of the gripper mechanism disposed in cooperating position with the mold apparatus, parts being broken away and shown in section;

Fig. 3 is a side elevation of the gripping mechanism, the confections being shown molded about the sticks or handles and removed from the molding apparatus;

Fig. 4 is a longitudinal sectional view of the gripper mechanism taken approximately through the center thereof;

Fig. 5 is a sectional view taken approximately on the line 5—5 of Fig. 2;

Fig. 6 is a sectional view taken approximately on the line 6—6 of Fig. 1; and

Fig. 7 is a fragmentary top plan view at one end of the gripper mechanism.

Like reference characters designate corresponding parts in the several figures of the drawings.

Referring first to Figs. 3, 4 and 7, the gripper or handling mechanism essentially comprises a pair of end plates 1 between which extend upper and lower telescopic bars 2 and 3 respectively, the bars being suitably connected to the end plates in a fixed manner, thereby forming a telescopic frame. Also extending between the end plates 1 are suitable guide bars 4 and 5 arranged in horizontally spaced relation to each other, these guide bars also being fixedly connected to the end plates and extending from each end plate only substantially half the length of the gripper apparatus when in collapsed position. In other words, the guide bars are arranged in pairs, each pair being carried by its end plate in opposed relation to the other so that the free extremities of the guide bars will substantially meet when the frame is collapsed. The end plates are provided with laterally extending flanges 6 by means of which the gripper apparatus or unit may be handled.

Pivotally and slidably mounted on the guide bars are the gripper elements, each element being composed preferably of a pair of jaws 7 and 8, jaws 7 being formed in a U-shape as at 9 and notched as at 10, while jaws 8 are formed substantially flat and angularly bent as at 11 to cooperate with the notches 10, jaws 11 also being notched as at 12. On jaws 7 and 8 are provided arms 13 and 14 respectively, arm 14 being preferably pivotally mounted on arm 13 as at 15. Suitable springs 16 extending about the pivot 15 and provided with tails or extensions 17 and 18 cooperate with the arms to normally maintain the jaws in closed or gripping position. The mounting of the gripping elements on the guide bars is accomplished by providing the arms 13 with transversely extending flanges in which apertures are provided as at 18 to receive the guide bars. Thus each gripping element is capable of being slid longitudinally on its respective guide bar and also rocked transversely thereby.

To properly space the gripping elements at equal intervals and effect simultaneous separation of the same, a lazy-tong arrangement 19 is provided for each row of gripping elements, the lazy-tong systems being made up of a plurality of crossed links pivotally connected together, the lower extremities of each link being pivotally secured to the lower portion of the arms 7 as at 20, the opposite ends of the links being slidably secured to the upper extremities of the arms 7 as at 21, notches 22 being provided in the arms to permit this sliding action.

To effect the variation of the distance between the gripper elements through the lazy-tong systems the end plates 1 are provided with projections 23 and 24 arranged in horizontally spaced relation on opposite sides of the upper telescopic bar 2 for the reception therebetween of the upper extremities of the arms 14 of each of the endmost gripping elements. A plate 25 is fixed in position in any suitable manner to extend between the free ends of the projections 23 and 24, a suitable aperture being formed in the plate through which the upper telescopic bar extends as at 26. Thus, the endmost gripping elements of each row are substantially fixedly secured to the end plates so that upon moving the end plates outwardly and away from each other, the gripping elements are simultaneously and equally spaced apart, the variation of this space being accomplished by the movement of the end plates towards and from each other. If desired, suitable braces 27 might be employed adjacent the free extremities of the guide bars 4 and 5, these braces merely acting as spacing elements to maintain the guide bars in parallel relation to each other. The braces may be made from a flat piece of metal with an aperture adjacent each end through which the guide bars may extend, the apertures being of sufficient size to enable the brace to be slid on the guide bars during the expansion and contraction of the unit.

To further limit the collapsing or inward movement of the frame, loose sleeves 28 might be employed by disposing the same on the guide bars intermediate the individual gripping elements. While the upper ends of the guide bars are arranged in abutting position, these ends may in time become worn or battered by frequent collapsing of the unit, and the sleeves 28 would therefore constitute a positive limitation of the inward or collapsing movement. As will be apparent from the drawings, the upper ends of the arms 14 are disposed in alignment adjacent the upper telescopic bar 2 when the jaws or grippers are in normal or ripping position. To open the jaws for the insertion of sticks or release of the same, it is only necessary to rock the arms 13 about the guide bars towards the arms 14, the arms 14 being retained stationary by abutment against the upper telescopic bar 2. Thus to open the jaws of all of the gripping jaws simultaneously a suitable release device or handle 30 may be provided as shown in Figs. 1 and 6, this release device comprising a flat plate 31 provided at its ends with handles or hand holds 32, and a trough shaped member 33 fixed to the plate 31 intermediate the ends thereof, the sides of the trough shaped member diverging outwardly and constituting camming surfaces. By inverting the stick gripping mechanism or confection handling unit, and shoving the same downwardly into the trough member so that the surfaces of the trough member engage the ends of the arms 13 of the individual gripping units or elements, the jaws are all opened simultaneously to condition the gripping unit for the reception of sticks as shown in Fig. 1 or for the removal of the confections therefrom after dipping and bagging as shown in Fig. 6. This release or holder mechanism is not claimed per se in the present application, but forms a part of a separate application Serial No. 637,193 filed of even date herewith.

After loading the gripping unit as shown in Fig. 1, the unit is removed from the release mechanism thereby allowing the jaws to firmly clamp the sticks in the unit, whereupon the unit is inverted from the position shown in Fig. 1 and positioned in the mold apparatus as shown in Figs. 2 and 5. It is to be understood that the gripping unit is in a collapsed condition when disposed in the mold apparatus whereby the sticks will be automatically centered with relation to the individual molds and suspended therein at the desired elevation.

The mold unit generally comprises a receptacle or pan 40 from the bottom of which are suspended the individual mold units 41, preferably arranged in longitudinal and transverse rows. The receptacle or pan thus constitutes a common hopper to enable the introduction of the confection material into the individual mold units. The lower extremities of the molds may be suitably braced if desired as by the longitudinal bracing members 42 connected to the closed lower extremities of each mold in any suitable manner and the transverse bracing elements 43 connected to the hopper on opposite sides thereof as at 44 and to the longitudinal braces 42. Handles 45 are provided at the ends of the hopper to enable the same to be carried as desired from one place to another as for the introduction of the same into the usual brine tank for freezing the confections and the removal of the same therefrom after the freezing operation. A runner frame is also preferably provided in the form of a substantially rectangular frame 46 suspended by members 47 fixed to the corners of the hopper as at 48. The mold apparatus above described is also not claimed in the present application but forms a part of a separate application Serial No. 637,192 filed of even date herewith.

It will be observed from the drawings that the gripper unit is provided with legs or projections 49 on the end plates to center the unit with respect to the mold apparatus, laterally extending flanges 50 also being provided to limit the downward movement of the unit into the hopper for the suspension of the sticks at the desired elevation.

The operation of the apparatus should be apparent from the foregoing description thereof and may be briefly summarized as follows:

The gripping or stick holding mechanism is inverted as shown in Fig. 1 of the drawings and forced into the release mechanism, thereby opening the jaws of the individual gripping elements to permit the introduction or loading of the sticks about which the frozen confection is to be subsequently formed. This loading may be effected by hand as shown or by any other suitable manner. Upon completion of the loading operation, the gripper unit is removed from the release device and inverted from the position shown in Fig. 1 to that position shown in Fig. 2, the same being introduced into the mold apparatus to automatically center and support the sticks or handles in a suspended position in the individual molds. In this position, it is understood that the gripper unit is in a contracted or collapsed condition, and the sticks are held at the desired elevation in the molds by the flanges 50 formed on the end plates which are adapted to rest on the upper end of the mold pan or hopper, the legs or projections 49 automatically centering the gripper unit with respect to the mold apparatus. It is also understood that preliminary to the introduction of the gripper unit into the mold apparatus, the molds are filled with the confection material which is liquid at normal temperatures, this being accomplished in the usual manner. As shown, the gripper unit and the mold unit are constructed for the manufacture of two rows of confections, but of course it is to be understood that the number of individual mold elements and the rows of the same may be increased as desired without modifying the principle of the invention.

With the parts as shown in Figs. 2 and 5, the entire apparatus is placed in the usual brine tank, or other freezing medium, the weight of the apparatus being supported by the runners 46 about the bottom of the mold unit. When the confection material has been frozen about the sticks or handles to the desired degree of hardness, the apparatus is removed from the brine tank or other freezing medium and momentarily placed in warm water to loosen the confections in the molds, whereupon the confections may be withdrawn from the molds by raising the gripper unit by means of the flanges 6 formed thereon, thereby presenting the confections in position for the dipping and bagging operations as shown in Figs. 3 and 4. By expanding the gripper unit as by moving the end plates of the same away from each other, the confections may be separated a greater distance to facilitate the dipping and bagging operations. The dipping is carried out in the usual manner as by submerging the confections in the chocolate or other coating material and withdrawing the same to permit the excess coating to drain off, the confections being supported during this procedure by the gripping unit. After the dipping operation, the gripping unit may be inverted to the position shown in Fig. 6 and the bags or wrappers placed over the confections when the coating has become congealed or hardened. If desired this congealing or hardening of the coating may be speeded up by passing the unit through a cooling chamber. To release the confections, the unit is placed in the release device as shown in Fig. 6, and the bagged or wrapped confections may then be removed from the gripping unit and packed for shipment or placed in storage containers which may be kept in a refrigerated condition. The apparatus is then ready for a repetition of the above described cycle of operations.

While the specific details of construction have been herein shown and described, the invention is not confined thereto as changes and alterations may be made without departing from the spirit thereof as defined by the appended claims.

Having thus described my invention what I claim as new and desire to secure by Letters Patent is:

1. A gripping unit for the manufacture of frozen confections, which comprises an expansible and contractible frame, a plurality of gripping elements pivotally and slidably carried by said frame, and means for automatically spacing said gripping elements equi-distantly on said frame in all expanded and contracted positions of the same.

2. A gripping unit for the manufacture of frozen confections, comprising an expansible and contractible frame, a plurality of gripping elements pivotally and slidably carried by said frame, said gripping elements being arranged in a plurality of longitudinally and transversely spaced rows, and means for automatically spacing said grippings elements equi-distantly on said frame in all expanded and contracted positions of the same.

3. A gripping unit for the manufacture of frozen confections on a stick, comprising an expansible and contractible frame, a plurality of stick gripping elements slidably carried by said frame, each of said stick gripping elements including a pair of gripping jaws having arms extending therefrom, one of said arms being pivotally connected to the other of said arms, means for normally maintaining said jaws in stick gripping position, and means for automatically spacing said gripping elements equi-distantly on said frame in all expanded and contracted positions of the same.

4. A gripping unit for the manufacture of frozen confections on a stick comprising a pair of spaced end plates, upper and lower telescopic bars extending between said end plates and constituting with said end plates an expansible and contractible frame, a pair of guide bars carried by each of said end plates in horizontally spaced position, said guide bars being arranged on said end plates in opposing relation with their free extremities in abutment when the frame is in a collapsed position, a plurality of gripping elements slidably and pivotally carried by said guide bars, each of said gripping elements including a pair of jaws having arms extending therefrom, one arm of each of said gripping element jaws being disposed adjacent to the upper telescopic bar, and a lazy-tong link system pivotally connected to the other arms of each of said gripping element jaws, and means for moving said gripping elements towards and from each other incident to the expansion and contraction of the frame as aforesaid.

5. A gripping unit for the manufacture of frozen confections on a stick, comprising a pair of spaced end plates, a plurality of telescopic bars extending intermediate said end plates in vertically spaced relation and constituting with said end plates an expansible and contractible frame, a plurality of pairs of guide bars carried by each of said end plates in horizontally spaced relation, said guide bars being arranged in opposing position with their free extremities abutting when said frame is in a contracted position, a plurality of stick gripping elements slidably carried by said guide bars and arranged in a plurality of longitudinal and transverse rows, a lazy-tong link system pivotally connected to the gripping elements of each of said longitudinal rows, and means for fixing the endmost gripping elements of each longitudinal row to said end plates whereby to automatically and equally vary the distance between said gripping elements of each longitudinal row incident to expansion and contraction of the frame aforesaid.

6. A gripping unit for the manufacture of frozen confections on a stick, comprising a pair of spaced end plates, a plurality of telescopic bars extending intermediate said end plates in vertically spaced relation and constituting with said end plates an expansible and contractible frame, a plurality of pairs of guide bars carried by each of said end plates in horizontally spaced relation, said guide bars being arranged in opposing position with their free extremities abutting when said frame is in a contracted position, a plurality of stick gripping elements slidably carried by said guide bars and arranged in a plurality of longitudinal and transverse rows, a lazy-tong link system pivotally connected to the gripping elements of each of said longitudinal rows, means for fixing the endmost gripping elements of each longitudinal row to said end plates whereby to automatically and equally vary the distance between said gripping elements of each longitudinal row incident to expansion and contraction of the frame aforesaid, and means for limiting the contraction of said frame.

7. A gripping unit for the manufacture of frozen confections on a stick, comprising a pair of spaced end plates, a plurality of telescopic bars extending intermediate said end plates in vertically spaced relation and constituting with said end plates an expansible and contractible frame, a plurality of pairs of guide bars carried by each of said end plates in horizontally spaced relation, said guide bars being arranged in opposing position with their free extremities abutting when said frame is in a contracted position, a plurality of stick gripping elements slidably carried by said guide bars and arranged in a plurality of longitudinal and transverse rows, a lazy-tong link system pivotally connected to the gripping elements of each of said longitudinal rows, means for fixing the endmost gripping elements of each longitudinal row to said end plates whereby to automatically and equally vary the distance between said gripping elements of each longitudinal row incident to expansion and contraction of the frame aforesaid, and means for limiting the contraction of said frame, said means comprising a plurality of sleeve members carried by said guide bars and interposing between said gripping elements.

8. A gripping unit for the manufacture of frozen confections on a stick, comprising a pair of spaced end plates, a plurality of telescopic bars extending intermediate said end plates in vertically spaced relation and constituting with said end plates an expansible and contractible frame, a plurality of pairs of guide bars carried by each of said end plates in horizontally spaced relation, said guide bars being arranged in opposed position with their free extremities abutting when said frame is in a contracted position, a plurality of stick gripping elements slidably carried by said guide bars and arranged in a plurality of longitudinal and transverse rows, a lazy-tong link system pivotally connected to the gripping elements of each of said longitudinal rows, means for fixing the endmost gripping elements of each longitudinal row to said end plates whereby to automatically and equally vary the distance between said gripping elements of each longitudinal row incident to expansion and contraction of the frame aforesaid, means for limiting the contraction of said frame, said means comprising a plurality of sleeve members carried by said guide bars and interposing between said gripping elements, and means for bracing said guide bars to maintain the same in parallel relation.

9. A gripping unit for the manufacture of frozen confections on a stick comprising a pair of spaced end plates, having laterally and outwardly extending flanges formed thereon to constitute handle members, a plurality of telescopic bars extending intermediate said plates in vertically spaced relation and constituting with said end plates an expansible and contractible frame, a plurality of pairs of guide bars carried by each of said end plates in horizontally spaced relation, said guide bars being arranged in opposed position with their free extremities abutting when said frame is in a contracted position, a plurality of stick gripping elements slidably carried by said guide bars and arranged in a plurality of longitudinal and transverse rows, a lazy-tong link system pivotally connected to the gripping elements of each of said longitudinal rows, a plurality of horizontally spaced inwardly extending projections carried by said end plates for receiving the endmost gripping elements of each longitudinal row therebetween, a plate member connecting the free extremies of said projections whereby to fix said endmost gripping elements relatively immovable with respect to said end plates whereby to automatically and equally vary the distance between said gripping elements of each longitudinal row incident to expansion and contraction of the frame aforesaid.

10. In apparatus for the manufacture of frozen confections on a stick, the combination with a multiple mold unit including a hopper having a plurality of individual molds suspended therefrom in a plurality of transverse and longitudinal rows, of a stick centering and supporting unit comprising an expansible and contractible frame, a plurality of gripping elements pivotally and slidably connected by said frame, and means for automatically spacing said gripping elements equi-distantly on said frame in all expanded and contracted positions of the same, said unit being adapted to be inserted telescopically within said hopper to dispose a stick gripping element centrally of each of said individual molds, for the suspension of a stick into said molds a predetermined distance, and means formed on said unit for supporting and centering the same with respect to said hopper.

11. In apparatus for the manufacture of frozen confections on a stick, the combination with a release device including a base plate having a trough like member secured thereto, the walls of said trough like member diverging outwardly and constituting camming surfaces, of a stick centering and supporting unit comprising an expansible and contractible frame, a plurality of gripping elements pivotally and slidably connected by said frame, and means for automatically spacing said gripping elements equi-distantly on said frame in all expanded and contracted positions of the same, said gripping elements being adapted to be released by the camming action of the trough like member incident to the positioning of the said unit in the same.

12. In apparatus for the manufacture of frozen confections, the combination with a gripper unit comprising a frame and a plurality of gripping members mounted upon said frame, of a release unit adapted to receive the gripper unit aforesaid including means for releasing the gripper members thereof when the two units are arranged in coacting relation.

13. In apparatus for the manufacture of frozen stick confections, the combination with a gripper unit comprising a frame and a plurality of gripping members arranged in parallel rows, said gripping members having operating handles extending therefrom, of a supporting unit adapted to receive and support said gripping unit in inverted position, said supporting unit including means adapted to act upon the handles of the gripping members to effect movement of the jaws thereof.

14. In apparatus for manufacturing frozen stick confections, the combination with a gripping device comprising a frame composed of end plates and a connecting rod therebetween, parallel rows of gripping members mounted in said frame and each including operating handles, one of which is arranged in coacting relation to the connecting rod aforesaid, of a support and release unit adapted to receive the gripping device and including spaced camming means for coacting with the other handle of each of the gripping members to effect movement of the gripping jaws thereof.

JOHN W. WEST.